May 16, 1967 W. WEISS ETAL 3,320,045
FURNACE FOR THE MANUFACTURE OF FUSED QUARTZ
Filed June 21, 1963 3 Sheets-Sheet 1
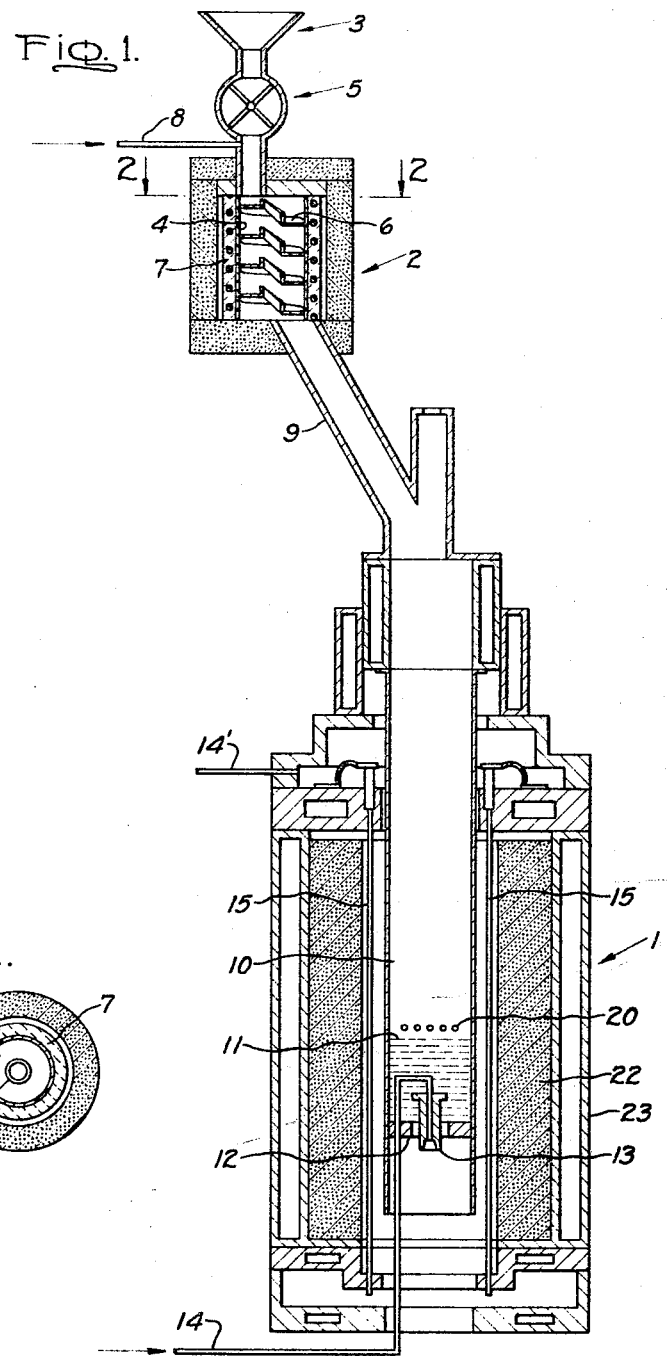
Inventors:
Werner Weiss
Karl Vatterodt
by Otto Tichy
Their Attorney Inventors:
Werner Weiss
Karl Vatterodt
by Otto Techy
Their Attorney

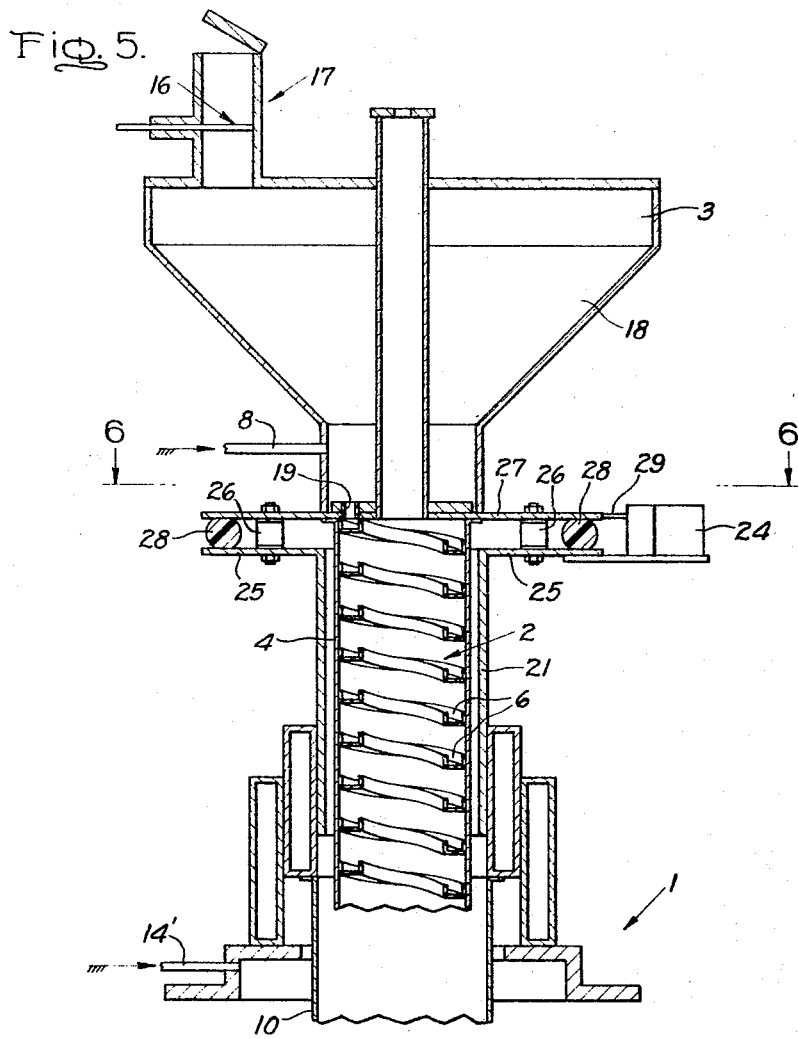
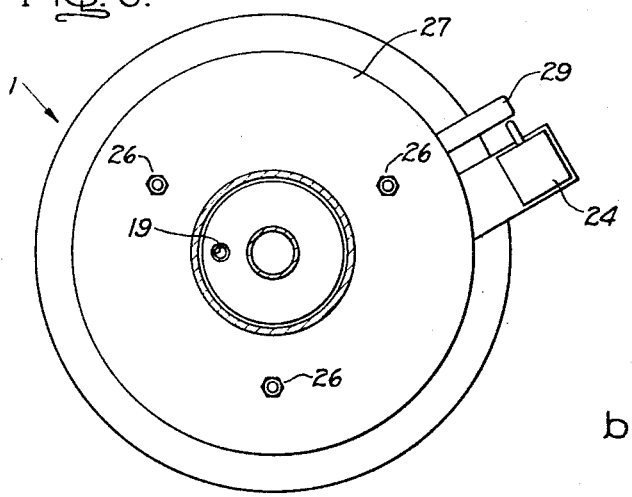

United States Patent Office 3,320,045
Patented May 16, 1967

3,320,045
FURNACE FOR THE MANUFACTURE OF FUSED QUARTZ
Werner Weiss, Berlin-Hermsdorf, and Karl Vatterodt, Berlin-Spandau, Germany, assignors to Patent-Treuhand-Gesellschaft für elektrische Glühlampen m.b.H.
Filed June 21, 1963, Ser. No. 289,643
Claims priority, application Germany, June 25, 1962, P 29,686
5 Claims. (Cl. 65—335)

The present invention relates to a method and apparatus for the continuous production of substantially bubble-free tubing, rods and the like from crystalline quartz or quartz-like glasses melted in an electrically heated furnace.

The constantly increasing use of fused quartz tubing particularly as envelopes for highly loaded electrical discharge devices, incandescent lamps, infrared radiators and the like has resulted in the development of tube drawing methods which make possible the production of fused quartz tubing on a mass production basis.

In the production of such tubing walnut size pieces of natural quartz rock crystal are loaded into a tungsten or molybdenum crucible which is indirectly heated electrically and provided at its bottom with a drawing nozzle provided with a circular aperture in which is mounted a hollow mandrel. The outside and the inside of the crucible, the hollow mandrel and the electric heater are washed with a flow of protective gas to prevent corrosion of these metal parts. In a preferred embodiment the crucible is provided with apertures or vents above the melt through which the protective gas may escape from the interior of the crucible carrying therewith any vapors ascending from the melt as described in the application of Karl Vatterodt, Ser. No. 157,389, filed in the United States Dec. 6, 1961, now U.S. Patent No. 3,212,871 and assigned to the assignee of the present application. The quartz melt flows at a suitable temperature out of the annular nozzle slot between the mandrel and the nozzle and forms tubing which is drawn off axially and vertically downward beneath the solidification range of the fused quartz by means of a suitable drawing device.

The quartz tubing produced in this manner is not always of the desired quality for certain uses. If the wall of the tubing contains capillary or bubble-shaped cavities is it not suitable for the production of envelopes for electric discharge lamps operated at high temperatures and pressures. Further, the physical properties, such as the durability, of the hollow ware made from such tubing are impaired. The cavities in the walls of the quartz tubing are caused by gas inclusions in the quartz melt which inclusions under certain conditions may have the form of extended cavities.

Gas inclusions in the melt are caused, in part, by loading the crucible in such manner that hollow spaces are present between the quartz crystals themselves and between the crystals and the surface of the melt and wall of the crucible. The protective gas within such spaces enters the melt in the course of melting the crystals in the crucible. However, even if this cause of gas inclusions in the melt is eliminated bubbles appear with irregular continuity in the wall of the quartz tubing drawn as described above.

Tests have shown that gas inclusions in the melt also are caused by the raw material, the quartz rock crystals.

It has been proven that certain quantities of gas are physically dissolved in quartz crystals. In about 50% of natural Brazilian quartz crystals tested a considerable quantity of gas was included which was set free in the melting process and formed bubbles which impaired the quality of the drawn quartz tubing. Due to the high viscosity of the fused quartz in the melt these bubbles cannot escape from the melt and appear in the drawn quartz tubing. The quartz crystals containing the dissolved gas cannot be detected from their appearance and their density differs by less than $10^{-4}$ g./cm.$^3$ from the quartz crystals free from such gas so that the presence of dissolved gas in the crystals cannot be ascertained before the melting process in producing the tubing. Chemical analysis of the gas in such bubbles has revealed that the protective gas is not included. The main component detected in Brazilian quartz crystals was nitrogen. Spectrometric examination of large quantities of such crystals has shown contents of nitrogen and nitrogen compounds. By this and other investigations it became apparent that at least some of the bubbles in the molten quartz was caused by gases physically dissolved in the quartz crystals. These dissolved gases cannot be eliminated by melting the crystals. However, we have discovered that they diffuse out of the crystals when the crystals are fired at a temperature of about 1000 to 1700° C., preferably between 1600 and 1700° C., in an atmosphere which is substantially free from nitrogen dissolved in the crystals.

It is known that substantially bubble free quartz tubing may be produced by melting quartz crystals or crystalline quartz sand in a graphite crucible under vacuum conditions at temperatures higher than 2000° C. to form an ingot. After cooling to solidify the ingot in the crucible, the crucible is broken away and the ingot is drawn into tubing by means of a drawing nozzle after being reheated to the softening temperature of the fused vitreous quartz. This method is effective for producing substantially bubble free quartz tubing but it is not economical since the production requires two heating steps and two handlings of the material which increases the cost of the tubing. Further, each charge requires a new graphite crucible and the two step heating requires a large consumption of energy to produce the required elevated temperatures.

The principal object of the present invention is to provide a method and apparatus for the continuous production of substantially bubble free fused quartz tubing, rods and the like whereby the cost of production is substantially reduced. Further objects and advantages of the invention will appear from the following detailed description and the accompanying drawings of the embodiments thereof.

In brief, the invention consists in drawing tubing, rods and the like from a melt of quartz crystals, crystalline quartz sand, or quartz-like glasses contained in a crucible provided with a bottom aperture suitable for shaping the tubing or rod after the crystals have been subjected to a preparatory heat treatment at a temperature lower than the melting temperature of the quartz raw material and in an atmosphere having a substantially lower partial pressure than the gas as physically dissolved in the crystals.

The apparatus for carrying out the method consists of a furnace for preparatory treatment of the material forming the melt so constructed and arranged with respect to the drawing furnace containing the melt that degassing of the crystalline quartz and drawing of the fused quartz into tubing is made in one operation.

The time required for effectively degassing the quartz crystals depends upon the size of the crystals and the temperature. In general the larger the size of the crystals the longer the heating time required to effectively degas them. However, extremely small grain sizes are disadvantageous in the melting process. A grain size of about 0.5 to 10 millimeters, preferably in the range of about 3 to 6 millimeters, which corresponds to a grain weight of about 0.2 to 3 grams has been found satisfactory. Before the crystals are introduced into the pretreatment furnace they are heated to a temperature higher than about 570° C., chilled, broken up to the required size, washed with hydrofluoric acid, rinsed and finally dried. Thereafter they are carried by means of a conveyor belt or manually to the furnace for preparatory treatment, that is, degassing.

Brazilian quartz crystals in which essentially nitrogen is dissolved are heated in the furnace for preparatory treatment in an atmosphere of argon, hydrogen, helium or mixtures of these gases for several minutes at a temperature of 1700° C. A mixture of 80% argon with an addition of 20% hydrogen has proven effective. In the heating process the dissolved gases diffuse out and the crystal grit may thereafter be transferred directly in heated condition to the melt. It is not necessary however to transfer the crystal grit in heated condition directly to the drawing furnace. When desired, the crystal grit may be cooled to a suitable temperature, such as room temperature, and then carried to the drawing furnace by a suitable conveyor. In the case of quartz crystals containing other gases, such as synthetic quartz crystals formed in the presence of argon or hydrogen, the preparatory heat treatment for degassing is carried out in a different gas, such as nitrogen.

Grain sizes different from the sizes mentioned above require different times and temperatures for degassing in the pretreatment furnace which may be readily determined by those skilled in the art from the above example.

A suitable apparatus for degassing the crystals prepared as above comprises a pretreatment furnace having a cylindrical crucible provided with a helical chute for travel of the crystal grit from the top to the bottom of the crucible. One edge of the helical plane of the chute butts against the crucible wall and the other edge has an upstanding border. The prepared crystal grit is fed into the top of the crucible in controlled quantity through a funnel and a gate, preferably a bucket wheel gate, onto the helical chute which terminates close to the inlet aperture of the drawing crucible in which the quartz crystals are melted. The crystal grains are moved along the helical chute by a vibrator mechanism continuously imparting slight vibrations to the chute. The slope of the chute and the amplitude of the vibrations determine the speed at which the crystals move downwardly along the chute and the time during which the crystals are exposed to heat in the pretreatment furnace. Coalescence of the crystals is prevented at higher degassing temperatures with such an arrangement so that gas inclusions in the spaces between the crystal grains are avoided. The crystal grit may be heated and degassed in a continuous heating furnace of other structure or a batch of the quartz crystals may be heated in a crucible with the required gas to attain the same end.

The relatively small grain size of the quartz crystals gives rise to the possibility that the gas used for protection against corrosion of the melting crucible may be included in spaces between the grains and carried into the melt if the feed of the grains into melting crucible is so rapid as to cause accumulations of the crystals on the surface of the melt. According to the present invention this is avoided by distributing the continuously fed quartz grit in a thin layer over the surface of the melt and in such quantity that as quartz tubing is drawn through the drawing nozzle in the bottom of the melting crucible the level of the melt in the crucible remains at the same height. The grit supplied to the crucible is distributed uniformly over the surface of the melt. The purification and breaking of the crystals may be carried out separately in various ways and in various devices, or this may be done also in a continuous procedure so that the purified and dried grains are introduced into the inlet aperture of the preheating furnace for degassing directly after the purifying process.

In the drawings accompanying and forming a part of this specification two embodiments of the invention are shown. Like numerals of reference indicate similar parts throughout the several views.

FIG. 1 is a longitudinal sectional partly schematic view of a melting furnace for the manufacture of quartz tubing and a pretreating furnace combined therewith.

FIG. 2 is a plan view partly in section of the pretreating furnace taken along the line 2—2 of FIG. 1 in the direction of the arrows.

FIG. 5 is a longitudinal sectional partly schematic view of a pretreatment furnace of the type shown in FIGS. 3 and 4 and including a vibrator mechanism for the chute.

FIG. 6 is a sectional view of the pretreatment furnace shown in FIG. 5 taken along the line 6—6 of FIG. 5 in the direction of the arrows.

Figure 3:
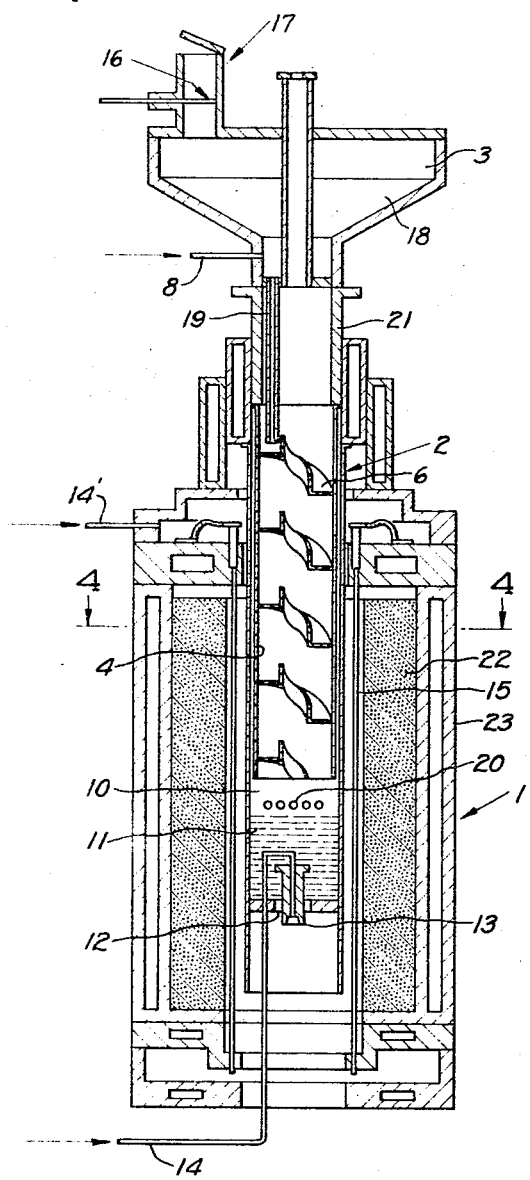
FIG. 3 is a view similar to FIG. 1 showing another embodiment of the invention.

Referring to FIGS. 1 and 2 of the drawings the quartz melting furnace 1 for the drawing of fused quartz tubing is of known structure. A furnace of this type is shown and described in U.S. Patent 2,998,469, patented Aug. 29, 1961, Karl Vatterodt, which patent is assigned to the assignee of the present application. The purified and broken crystals having a grain size of 0.5 to 10 millimeters, preferably 3 to 6 millimeters, and a weight of 0.2 to 3 grams are supplied continuously through the funnel 3 to the crucible 4 of the preheat furnace 2. The crystal grit falls on the helical chute 6 and moves downwardly partly by its own weight and partly by a vibrating device not shown in these figures of the drawings through the furnace 2 with controllable speed. Between the funnel 3 and the crucible 4 a bucket wheel gate 5 is mounted which prevents the escape of the scavenging gas required in the pretreatment of the crystals. The pretreating furnace 2 is heated to a controllable inner temperature of about 1100° C. to 1700° C. by a suitable electrical heating means such as the tungsten wire coil shown in FIG. 1. The temperature required depends upon the grain size of the crystal grit and the speed at which the grit passes through the furnace. For example, when the grain size is such that the grains have a weight of 0.5 to 1 gram and when the inner temperature of the furnace 2 is 1700° C. the grains are effectively degassed in one to several minutes. The time required for degassing is increased with crystals of larger size and may take several hours depending on the crystal size. The gas used in the degassing of the crystals and serving at the same time as the protective gas for the metal parts of the pretreatment furnace 2 is introduced into the interior of the furnace 2 through the conduit 8 connected to a supply (not shown) of such gas under suitable pressure. The conduit 8 opens into the furnace 2 below the gate 5 as shown. The kind of gas introduced into the interior of the furnace 2 through the conduit 8 depends upon the kind of gas physically dissolved in and to be removed from the quartz crystals. In the case of Brazilian quartz crystals containing essentially nitrogen and nitrogen compounds an atmosphere of argon or a mixture of 80% argon and 20% hydrogen in the furnace 2 has proven to be effective for degassing the crystals and protecting the metallic parts of the furnace against corrosion.

Crucible 4 and the helical chute 6 consist preferably of molybdenum or tungsten sheet or other refractory material. The inner edge of the chute is provided with an upstanding border to prevent the crystal grit from falling through the middle of the furnace directly onto the bottom of the crucible 4. The heating coil 7 and the inner and outer surface crucible 4 in the furnace 2 are washed by the protective gas introduced into the furnace 2 through the conduit 8. The pretreating furnace 2 is heat insulated as shown schematically in FIG. 1.

The degassed quartz grit passes through the pipe 9 leading from the pretreating furnace 2 and falls into the crucible 10 of the melting furnace 1. As pointed out above it is important that the pretreated raw material be supplied to the crucible 10 in such amount that the height of the melt in the crucible 10 remain substantially constant during the tube drawing operation. The grit is distributed uniformly over the surface of the melt 11 in the crucible 10 in a layer having a thickness corresponding to about the grain size of the crystals in order to prevent protective gas being trapped between the grit and the surface of the melt and thus brought into the melt 11.

The crystals sink into the melt and become molten quickly. The melt flows out of the drawing aperture 12 around the mandrel 13 in the form of tubing and is drawn off beneath the solidification zone vertically downward by means of a drawing device not shown in the drawings. The mandrel 13 is a hollow cylindrical molybdenum mandrel and is supplied through conduit 14 opening into its interior with a protective gas to prevent oxygen coming into contact with the mandrel.

The furnace 1 includes a plurality of tungsten heater wires or rods 15 arranged in an annular series around the crucible 10. The metal parts of the furnace 1 including the outer surface of crucible 10 and the tungsten heating wires 15 are washed by protective gas introduced at the top of the furnace 1 through the conduit 14', and flowing out of the bottom of the furnace.

Figure 4:
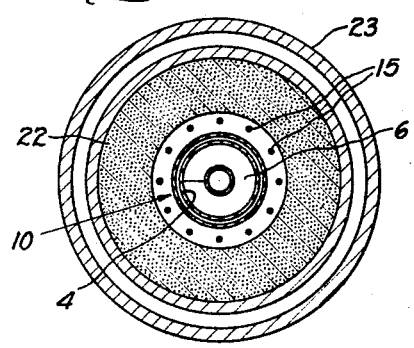
FIG. 4 is a top view in section of the furnace shown in FIG. 3 taken along the line 4—4 of FIG. 3 in the direction of the arrows.

In the embodiment of the invention shown in FIGS. 3 and 4 of the drawings the pretreating furnace 2 is mounted directly in the crucible 10 of the melting furnace 1 and above the melt 11.

In this embodiment of the invention the purified quartz crystals of a grain size 0.5 to 10 millimeters are introduced through the inlet port 17 having a gate 16 into the compartment 18 and fall through pipe 19 into the pretreating furnace 2. The gas required for degassing the purified crystals is supplied through conduit 8 and fills the interior of the compartment 18, furnace 2 and crucible 10 to serve also as the protective gas for the metal parts over which it flows. The crystal grit falls onto the chute 6 and is caused to travel downwardly along the chute by a vibrating device not shown in these figures of the drawings. As the grit travels downwardly along the chute 6 it is heated to the temperature required for degassing the crystals and falls finally on the surface of the melt 11 on which it is distributed in a thin uniform layer by the vibration of chute 6. The speed at which the grit moves downwardly is adjustable as a function of the grain size and the amplitude of the vibrations imparted to the chute 6 as in the embodiment of FIGS. 1 and 2.

A feature of the construction shown in FIG. 3 of the drawings is the adjustability of the pretreating furnace 2 vertically in the crucible 10 by the means shown schematically at 21. The position of the lower edge of the pretreating furnace 2 thus may be adjusted into a suitable temperature range of crucible 10. The outlet aperture of the furnace 2 should preferably be at that level of the crucible 10 at which a temperature of about 1700° C. exists. The crucible 10 in both embodiments of the invention has a circumferential series of small apertures or vents 20 through the wall thereof and located at a level slightly above the surface of the melt 11 and through which the scavenging and protective gas, that is, the mixture of argon and hydrogen mentioned above, introduced into the interior of the furnace 2 and the crucible 10 through the conduit 8 may escape from the interior of crucible 10 carrying with it the quartz vapors ascending from the melt 11. This is quite necessary in furnaces embodying the invention and of the structure shown in the drawings to prevent quartz vapors from penetrating into the pretreatment furnace 2.

In each of the furnaces shown in the drawings the annular series of heating wires 15 for crucible 10 is surrounded by a heat insulating sheath 22 of zirconium oxide, for example, which is enclosed by a water-cooled metal jacket 23 and the wires 15 are supplied with electric current by a low voltage transformer, all as described in Patent No. 2,998,469 referred to above.

While the vibrating device mentioned above has not been shown in FIGS. 1 to 4 of the drawings for simplicity of illustration such a device 24 of conventional structure, the amplitude of vibration of which may be varied, is shown in FIGS. 5 and 6 of the drawings included in a pretreatment furnace of the type shown in FIGS. 3 and 4. As shown in FIGS. 5 and 6 the vibrating device 24 is connected to a flange 25 in which the part 21 of the pretreating furnace terminates with its upper end. This flange 25 carries by means of elastic intermediate pieces 26 another flange 27 to which the crucible 4 containing the chute 6 is fixed in suspended manner and which carries the funnel. Between both these flanges 25 and 27 there is provided a packing ring 28 so that the inside of the crucible 4 is sealed-off at this place from the surrounding atmosphere. The flange 27 from which the crucible 4 suspends is provided with a lateral striking post 29 which is actuated tangentially by the vibrator 24.

What we claim as new and desire to secure by Letters Patent of the United States is:

1. In combination, an electric furnace for the continuous production of fused quartz from crystalline quartz comprising an elongated crucible open at the top for the introduction of quartz crystals, an aperture at the bottom of the crucible for the flow of molten fused quartz out of the crucible, a pretreatment furnace and means mounting the pretreatment furnace in communication with and above the level of the melt in the crucible for delivering pretreated crystals by gravity to the crucible, means for heating the interior of the pretreatment furnace to an elevated temperature lower than the melting temperature of the crystals to be treated, a conduit opening into said pretreatment furnace for the introduction of gas having a lower partial pressure than the gas physically dissolved in the crystals, and means for guiding the crystals through the pretreatment furnace and into the crucible.

2. The combination according to claim 1 wherein the pretreatment furnace is mounted in the open top portion of the crucible.

3. The combination according to claim 1 wherein the pretreatment furnace is mounted in the open top portion of the crucible and the means mounting the pretreatment furnace is adapted for adjusting the height of the pretreatment furnace in the crucible.

4. The combination according to claim 1 wherein the means for guiding the crystals includes a helical chute mounted in the pretreatment furnace.

5. The combination according to claim 1 wherein the means for guiding the crystals includes a helical chute mounted in the pretreatment furnace and a vibrating device is connected to the chute.

References Cited by the Examiner

UNITED STATES PATENTS

| 2,505,001 | 4/1950 | Nordberg | 65—32 X |
| 2,612,726 | 10/1952 | Nordberg | 65—32 |
| 2,686,212 | 8/1954 | Horn et al. | 65—32 X |
| 2,877,280 | 3/1959 | Eden | 13—6 |
| 2,892,739 | 6/1959 | Rusler | 65—33 X |
| 3,077,273 | 2/1963 | Zellers | 65—335 X |
| 3,224,851 | 12/1965 | Hicks | 65—32 X |

S. LEON BASHORE, *Acting Primary Examiner.*

DONALL H. SYLVESTER, *Examiner.*

R. L. LINDSAY, *Assistant Examiner.*